US012756036B2

(12) United States Patent
Lee et al.

(10) Patent No.: US 12,756,036 B2
(45) Date of Patent: *Oct. 6, 2026

(54) BATTERY PACK HAVING BLOCKING PLATE OVER A CONNECTION BUSBAR

(71) Applicant: LG ENERGY SOLUTION, LTD., Seoul (KR)

(72) Inventors: Tae Kyeong Lee, Daejeon (KR); Seong Yeon Won, Daejeon (KR); Yun Hyeok Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 873 days.

This patent is subject to a terminal disclaimer.

(21) Appl. No.: 17/626,158

(22) PCT Filed: Jan. 5, 2021

(86) PCT No.: PCT/KR2021/000060

§ 371 (c)(1),
(2) Date: Jan. 11, 2022

(87) PCT Pub. No.: WO2021/141345

PCT Pub. Date: Jul. 15, 2021

(65) Prior Publication Data

US 2022/0376323 A1 Nov. 24, 2022

(30) Foreign Application Priority Data

Jan. 6, 2020 (KR) ........................ 10-2020-0001345

(51) Int. Cl.
*H01M 10/658* (2014.01)
*H01M 50/24* (2021.01)
(Continued)

(52) U.S. Cl.
CPC ......... *H01M 10/658* (2015.04); *H01M 50/24* (2021.01); *H01M 50/258* (2021.01);
(Continued)

(58) Field of Classification Search
None
See application file for complete search history.

(56) References Cited

U.S. PATENT DOCUMENTS 4,546,056 A * 10/1985 Jessen ................. H01M 50/213
429/104
10,950,915 B2 * 3/2021 Nakayama .......... H01M 50/507
(Continued)

FOREIGN PATENT DOCUMENTS

CN 104184004 A 12/2014
CN 104821385 A 8/2015
(Continued)

OTHER PUBLICATIONS

International Search Report (PCT/ISA/210) issued in PCT/KR2021/000060 mailed on Apr. 12, 2021.
(Continued)

*Primary Examiner* — Amanda J Barrow
(74) *Attorney, Agent, or Firm* — Birch, Stewart, Kolasch & Birch, LLP

(57) ABSTRACT

A battery pack includes a plurality of submodules, a pack case and a connection busbar configured to connect a first submodule and a second submodule to each other. The first submodule of the plurality of submodules includes a terminal unit connected to the connection busbar, the top surface of the first submodule being spaced from a bottom surface of the first submodule in a vertical direction, a blocking plate configured to cover the terminal unit in the vertical direction, an upper end of the connection busbar, and a side surface of the connection busbar and a thermal insulation cover cov-
(Continued)

ering the blocking plate. The terminal unit, the connection busbar, and the blocking plate are stacked in the vertical direction. The blocking plate comprises an upper structure and a side structure extending downwardly from a front edge of the upper structure and below the top surface of the first submodule.

15 Claims, 12 Drawing Sheets

(51) Int. Cl.
*H01M 50/258* (2021.01)
*H01M 50/505* (2021.01)
*H01M 50/543* (2021.01)
*H01M 50/59* (2021.01)

(52) U.S. Cl.
CPC ....... *H01M 50/505* (2021.01); *H01M 50/543* (2021.01); *H01M 50/59* (2021.01)

(56) References Cited

U.S. PATENT DOCUMENTS

| | | | | |
|---|---|---|---|---|
| 11,177,530 | B2* | 11/2021 | You | H01M 50/211 |
| 2009/0104516 | A1* | 4/2009 | Yoshihara | H01M 50/503 429/149 |
| 2012/0058382 | A1 | 3/2012 | Carignan et al. | |
| 2012/0082875 | A1 | 4/2012 | Watanabe et al. | |
| 2012/0115016 | A1 | 5/2012 | Kim | |
| 2012/0301765 | A1* | 11/2012 | Loo | H01M 50/224 429/100 |
| 2014/0065474 | A1* | 3/2014 | Werner | H01M 50/186 429/185 |
| 2014/0349165 | A1 | 11/2014 | Ogasawara et al. | |
| 2015/0221921 | A1 | 8/2015 | Choi et al. | |
| 2015/0280190 | A1* | 10/2015 | Ohshiba | H01M 50/209 429/100 |
| 2016/0036088 | A1 | 2/2016 | Tononishi | |
| 2017/0201039 | A1* | 7/2017 | Jenkin | H01R 13/523 |
| 2017/0331164 | A1 | 11/2017 | Kwon | |
| 2018/0151921 | A1 | 5/2018 | Yun | |
| 2018/0194235 | A1 | 7/2018 | Kim et al. | |
| 2019/0051882 | A1* | 2/2019 | Nakayama | H01M 50/507 |
| 2019/0081311 | A1* | 3/2019 | Zeng | H01R 12/774 |
| 2019/0131664 | A1* | 5/2019 | Ardisana, II | H01M 50/209 |
| 2019/0198849 | A1 | 6/2019 | Nakayama et al. | |
| 2019/0221817 | A1* | 7/2019 | Jeon | H01M 50/50 |
| 2020/0106079 | A1* | 4/2020 | You | H01R 4/70 |
| 2020/0127253 | A1* | 4/2020 | Liu | H01M 50/209 |
| 2020/0168887 | A1 | 5/2020 | Yoo et al. | |
| 2020/0176734 | A1 | 6/2020 | Kang et al. | |
| 2020/0176739 | A1* | 6/2020 | You | H01M 50/224 |
| 2020/0189400 | A1 | 6/2020 | Kim et al. | |
| 2020/0395643 | A1 | 12/2020 | Seo et al. | |
| 2020/0411924 | A1 | 12/2020 | Yun | |
| 2021/0265750 | A1* | 8/2021 | Rieder | H01R 11/288 |
| 2021/0344074 | A1* | 11/2021 | Jung | H01M 50/593 |
| 2022/0094012 | A1* | 3/2022 | Liu | H01M 50/296 |
| 2022/0190404 | A1* | 6/2022 | Choi | H01M 50/224 |
| 2022/0247004 | A1 | 8/2022 | Yun | |
| 2023/0124214 | A1* | 4/2023 | Jung | H01M 50/262 429/99 |
| 2023/0299411 | A1* | 9/2023 | Han | H01M 50/289 429/120 |
| 2024/0014526 | A1* | 1/2024 | Park | H01M 50/503 |
| 2024/0039126 | A1* | 2/2024 | Kim | H01M 50/507 |

FOREIGN PATENT DOCUMENTS

| | | | | |
|---|---|---|---|---|
| CN | 105322122 | A | 2/2016 | |
| CN | 107369863 | A | 11/2017 | |
| CN | 109690825 | A | 4/2019 | |
| CN | 209217036 | U | 8/2019 | |
| DE | 10-2018-114764 | * | 12/2019 | H01M 2/20 |
| JP | 6130733 | B2 | 5/2017 | |
| JP | 2017-130338 | A | 7/2017 | |
| JP | 2018-41543 | A | 3/2018 | |
| JP | 2019-500736 | A | 1/2019 | |
| KR | 10-2012-0034027 | A | 4/2012 | |
| KR | 10-2014-0015252 | A | 2/2014 | |
| KR | 10-2017-0003791 | A | 1/2017 | |
| KR | 10-2017-0028647 | A | 3/2017 | |
| KR | 10-2017-0127273 | A | 11/2017 | |
| KR | 10-2018-0058552 | A | 6/2018 | |
| KR | 10-2018-0060822 | A | 6/2018 | |
| KR | 10-2019-0088675 | A | 7/2019 | |
| KR | 10-2019-0095045 | * | 8/2019 | H01M 2/20 |
| KR | 10-2019-0095045 | A | 8/2019 | |
| KR | 10-2019-0096674 | A | 8/2019 | |
| TW | 460078 | U | 5/2026 | |
| WO | WO 2019/156390 | A1 | 8/2019 | |
| WO | WO 2019/177275 | A1 | 9/2019 | |
| WO | WO 2019/232917 | * | 12/2019 | H01R 4/50 |
| WO | WO 2019/235724 | A1 | 12/2019 | |

OTHER PUBLICATIONS

Extended European Search Report for European Application No. 21738120.1, dated Dec. 20, 2023.

* cited by examiner

【FIG. 1】
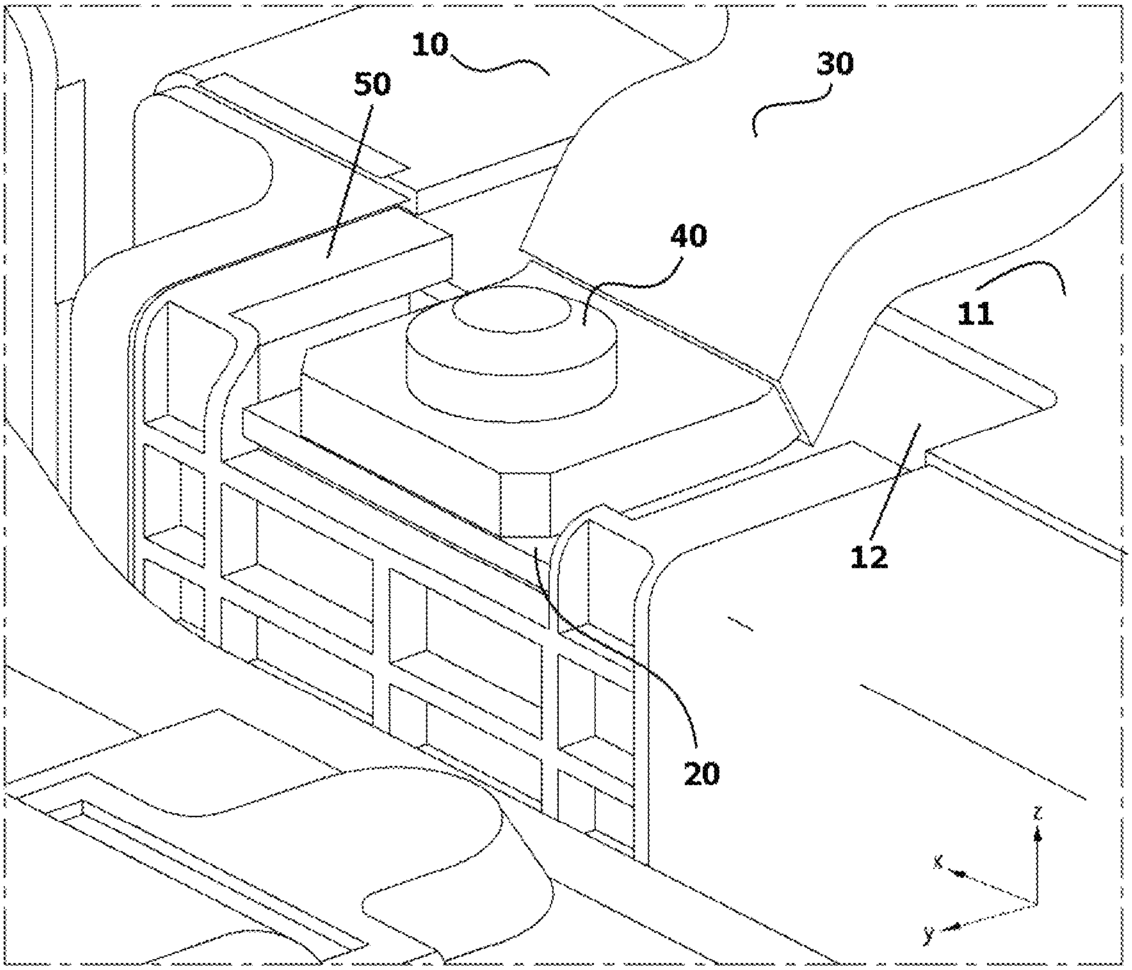
Prior Art

【FIG. 2】
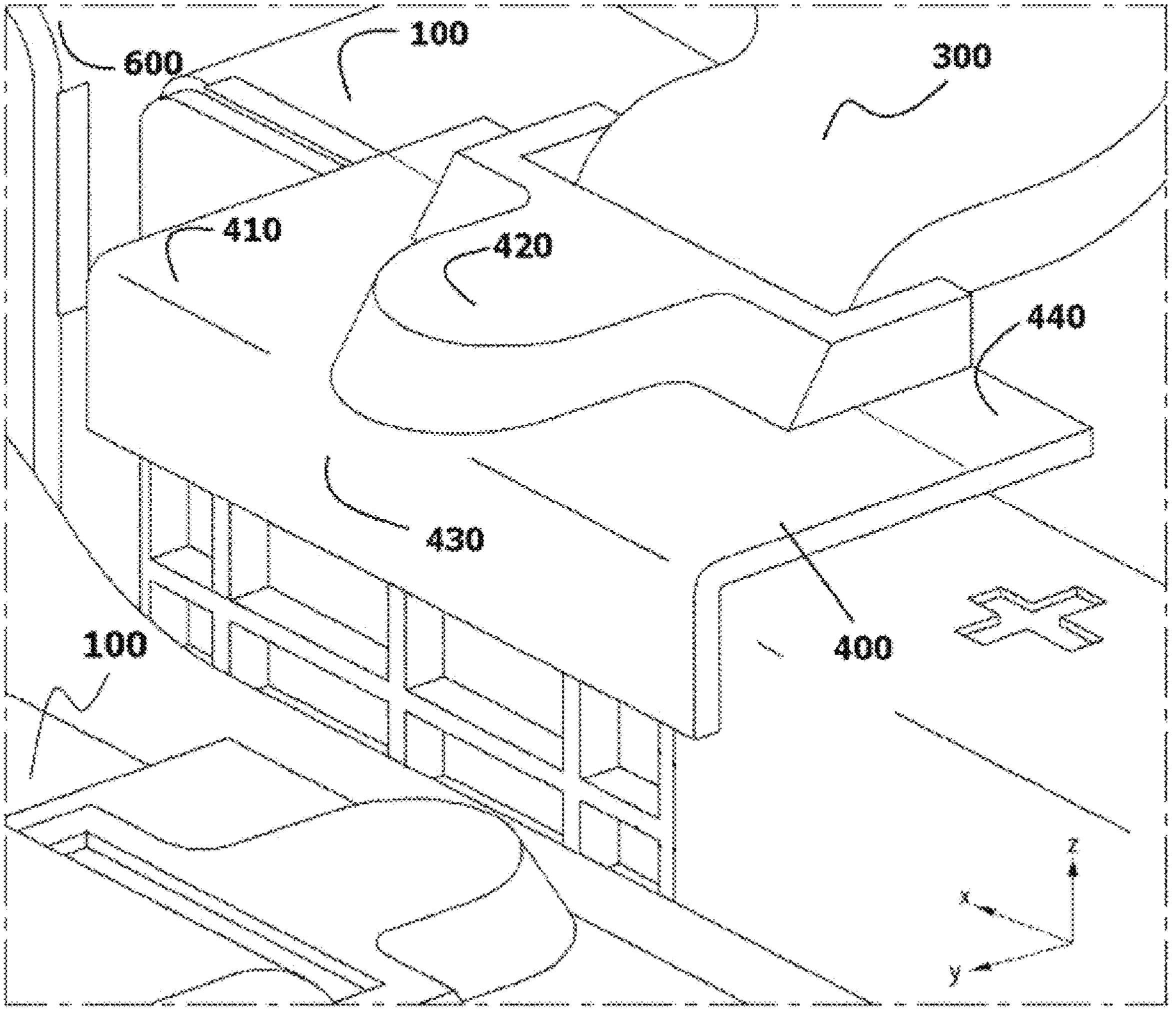

【FIG. 3】
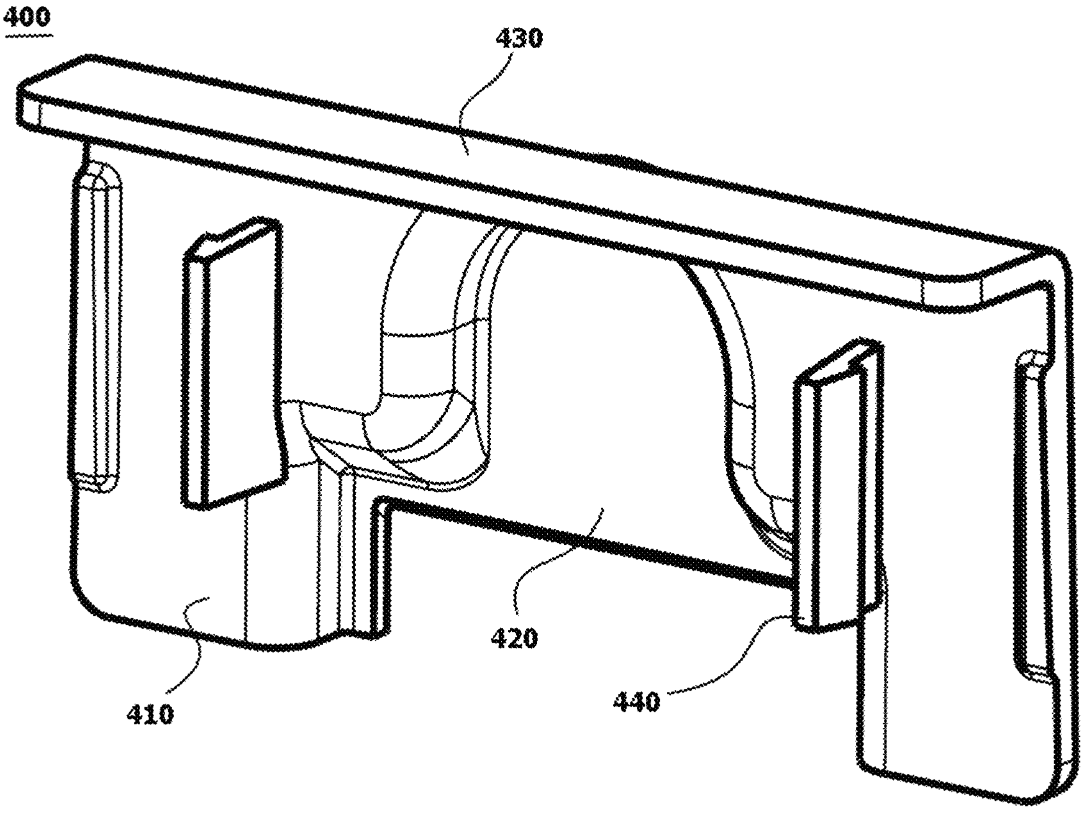

【FIG. 4】
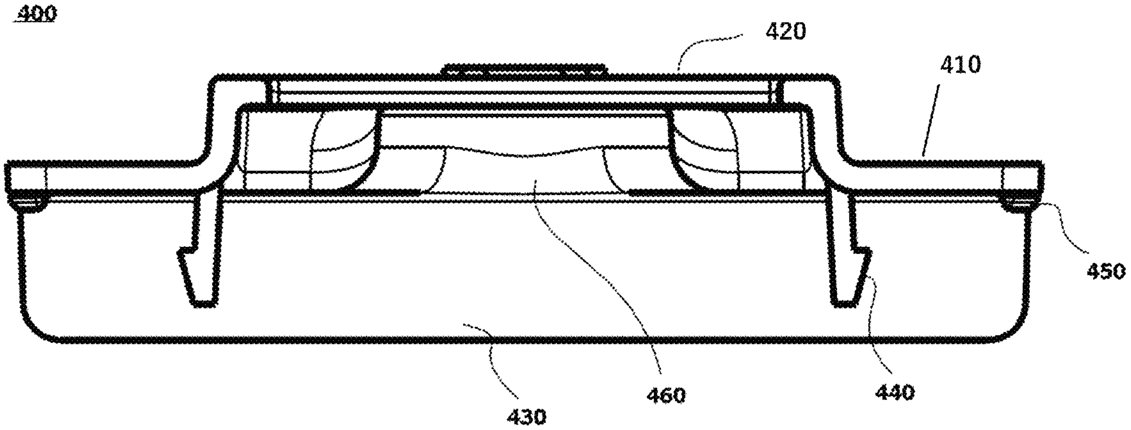
【FIG. 5】
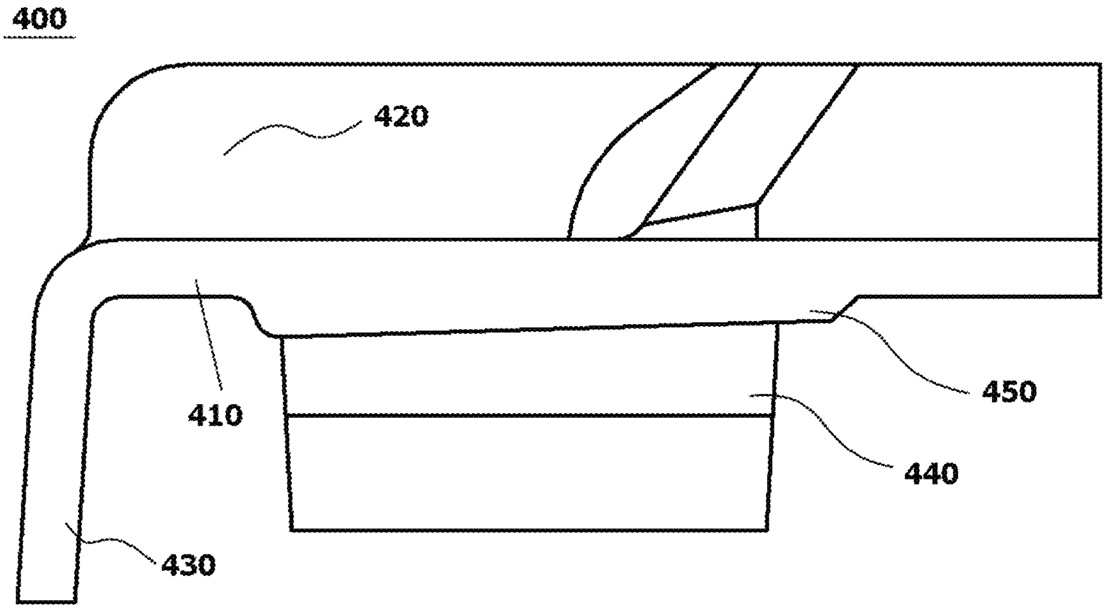

【FIG. 6】
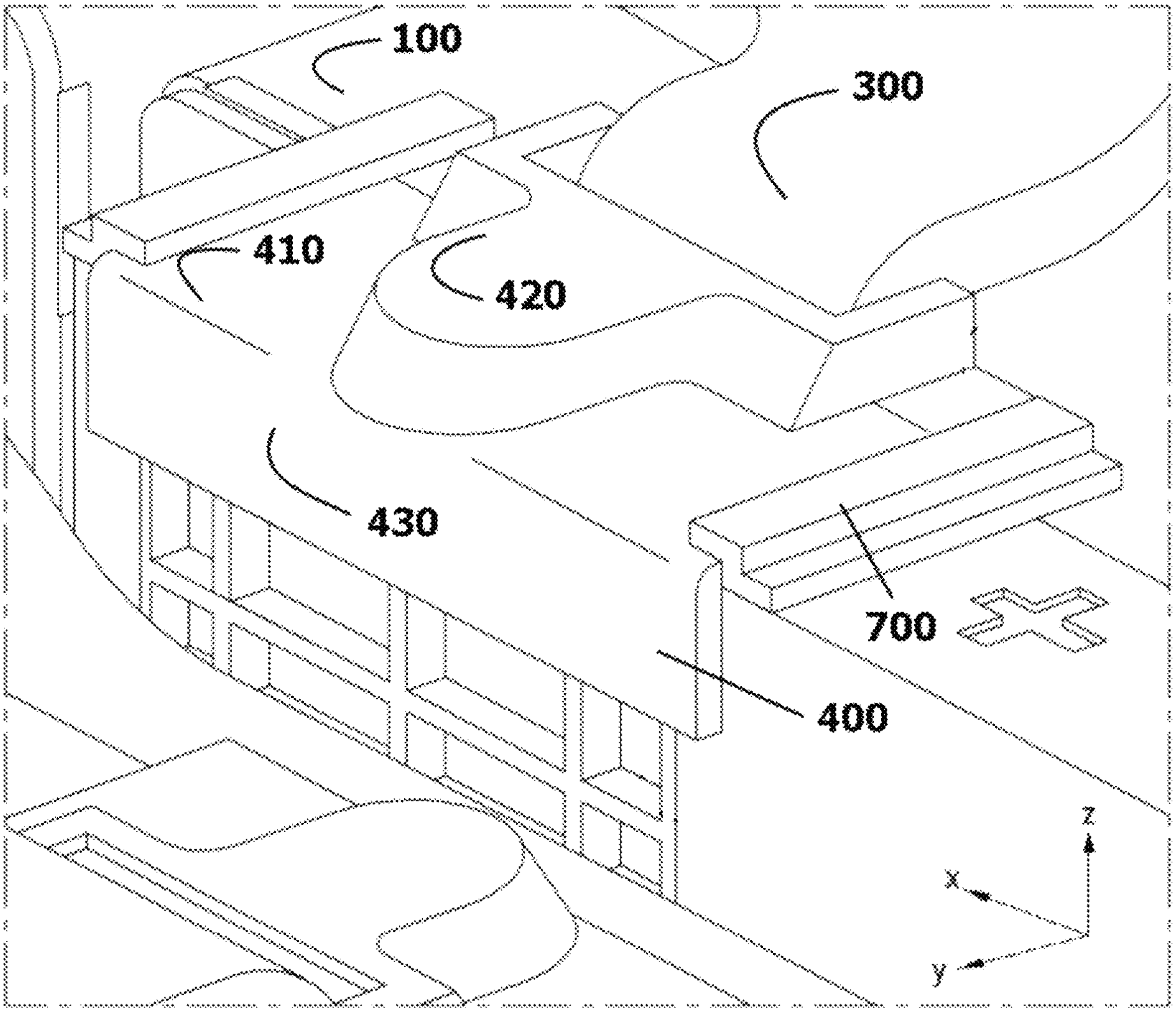

【FIG. 7】
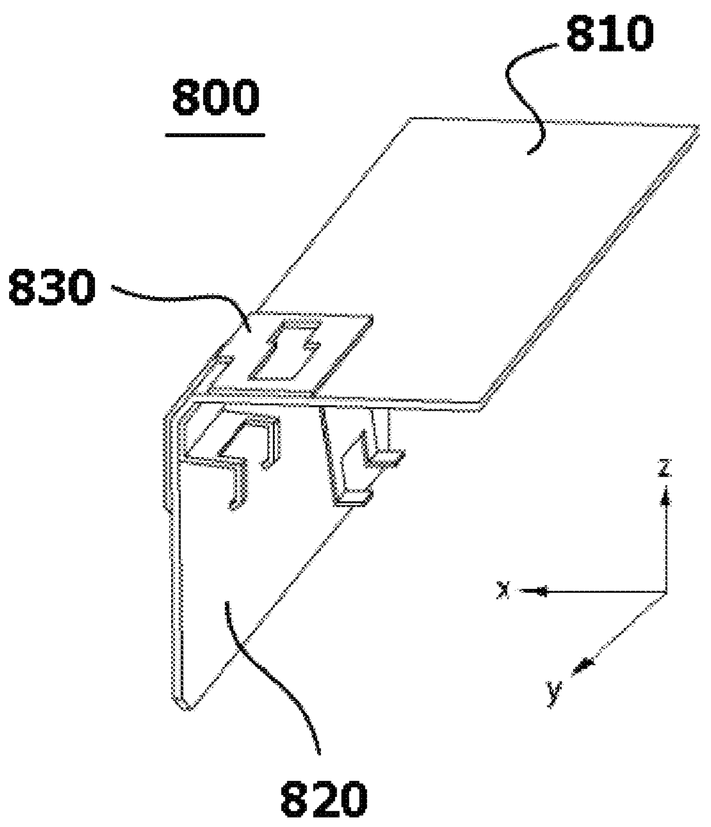

【FIG. 8】
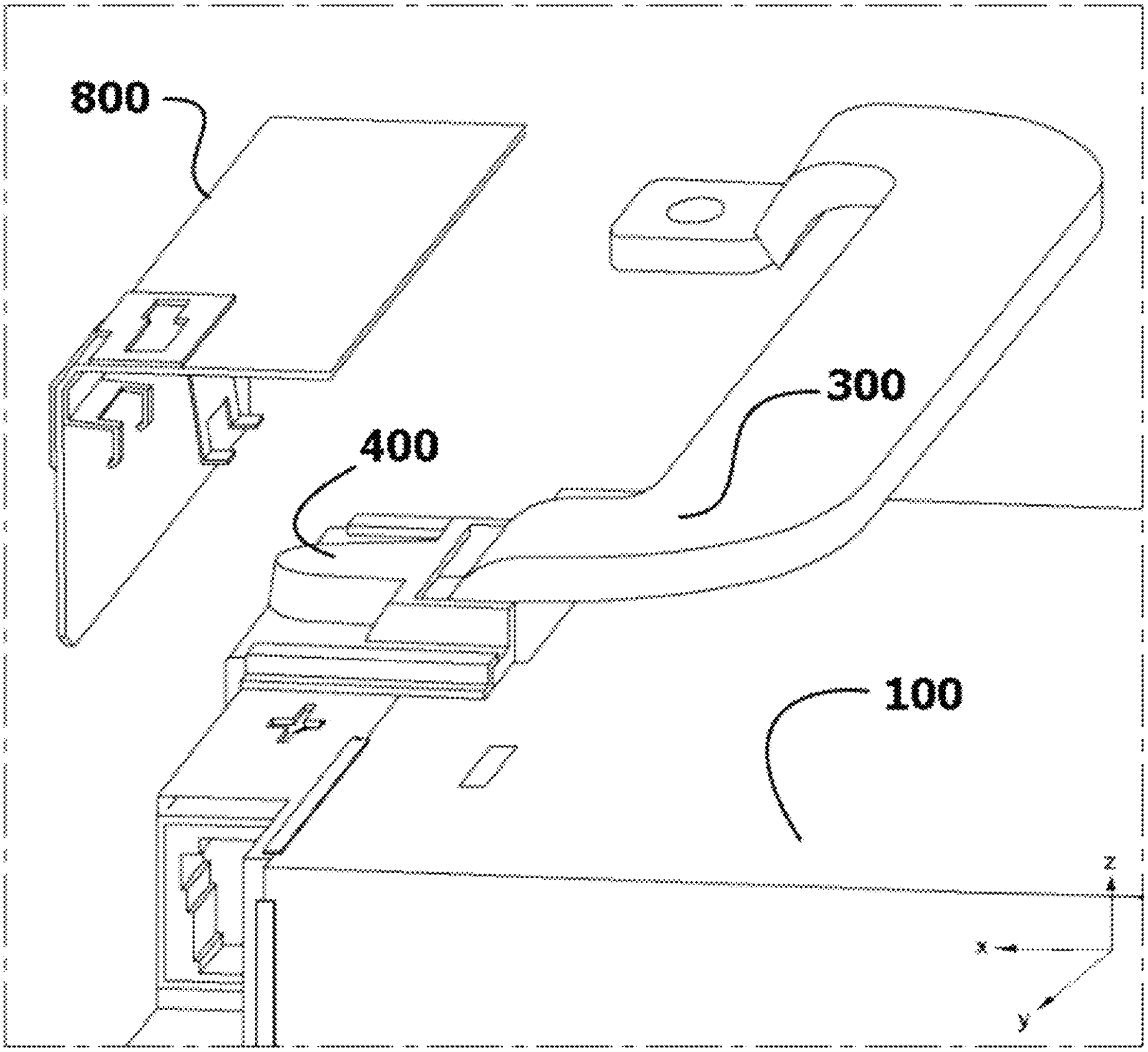

【FIG. 9】
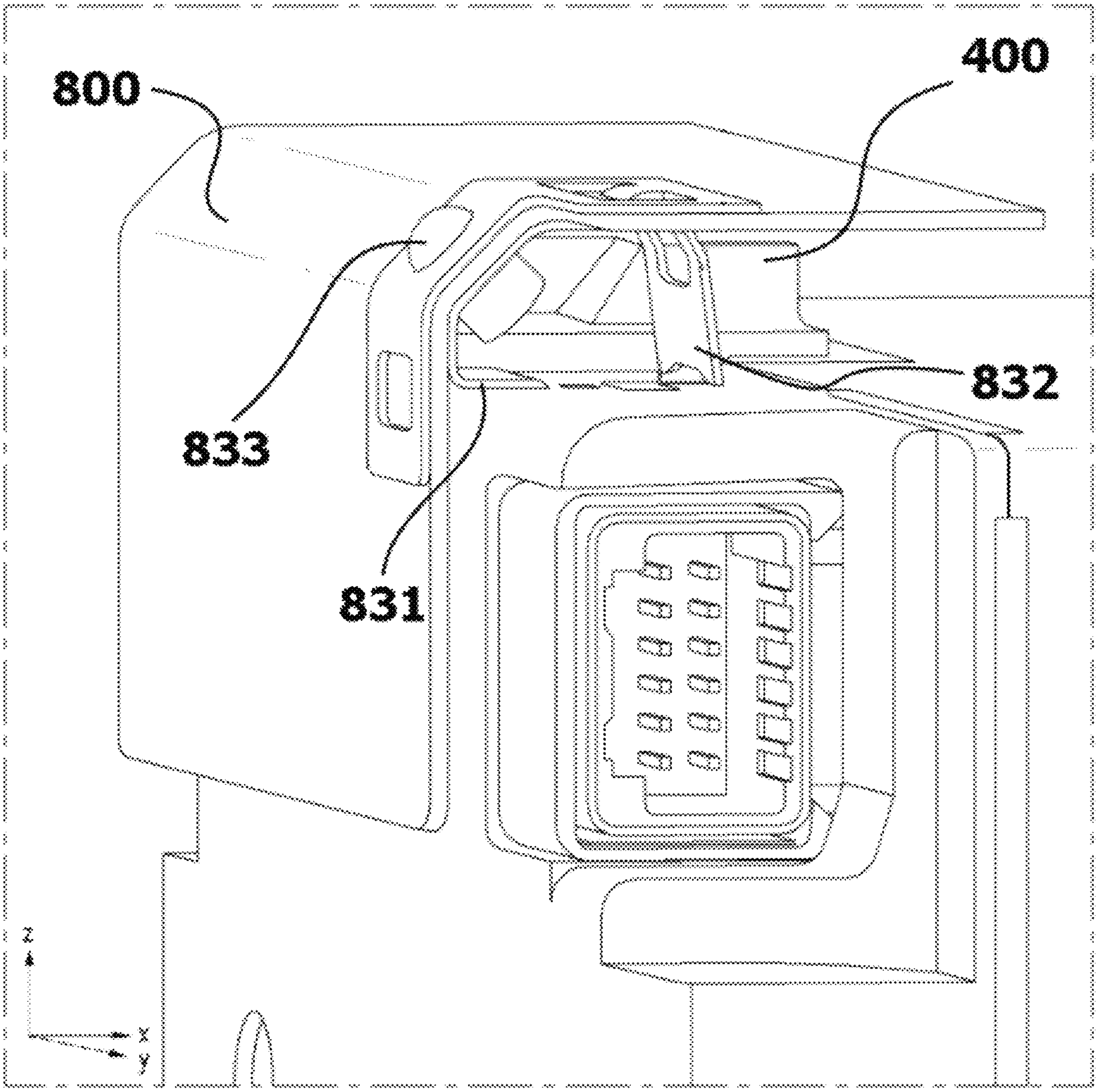

【FIG. 10】
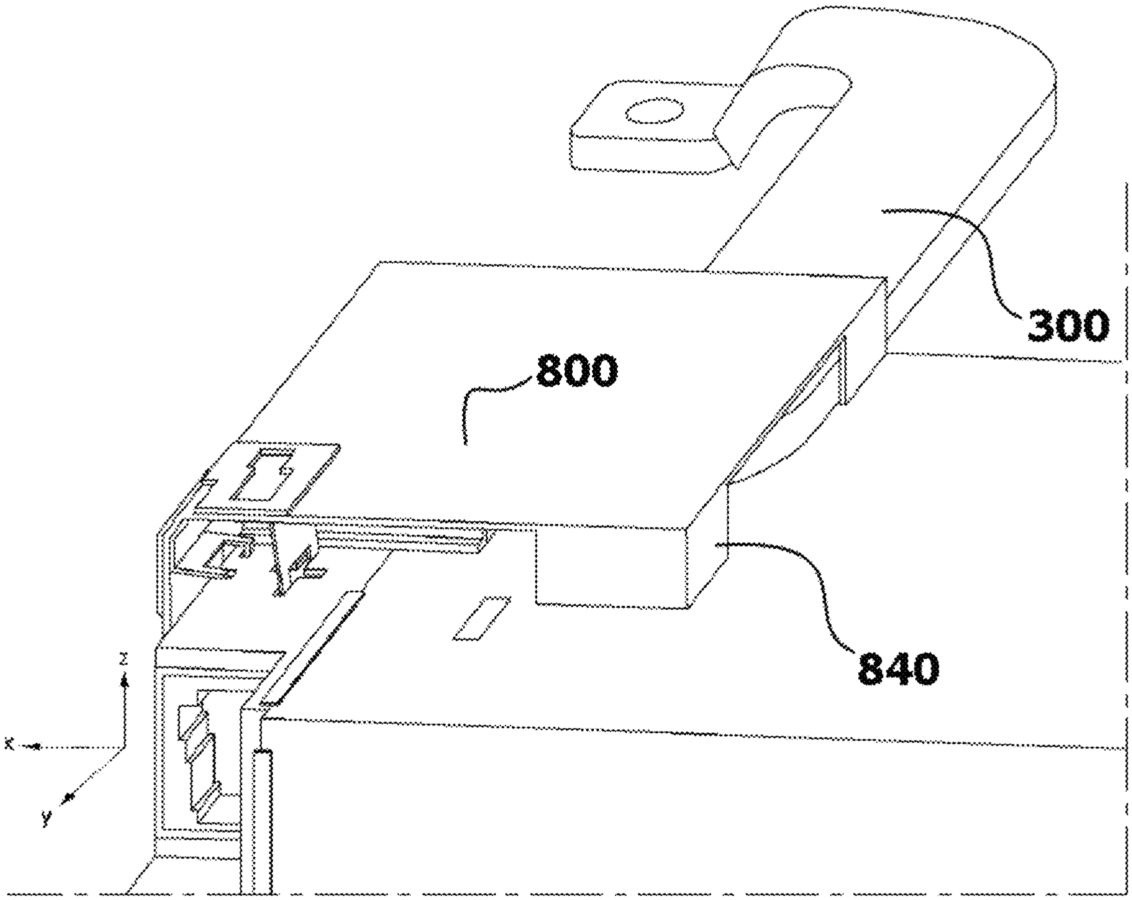

[FIG. 11]
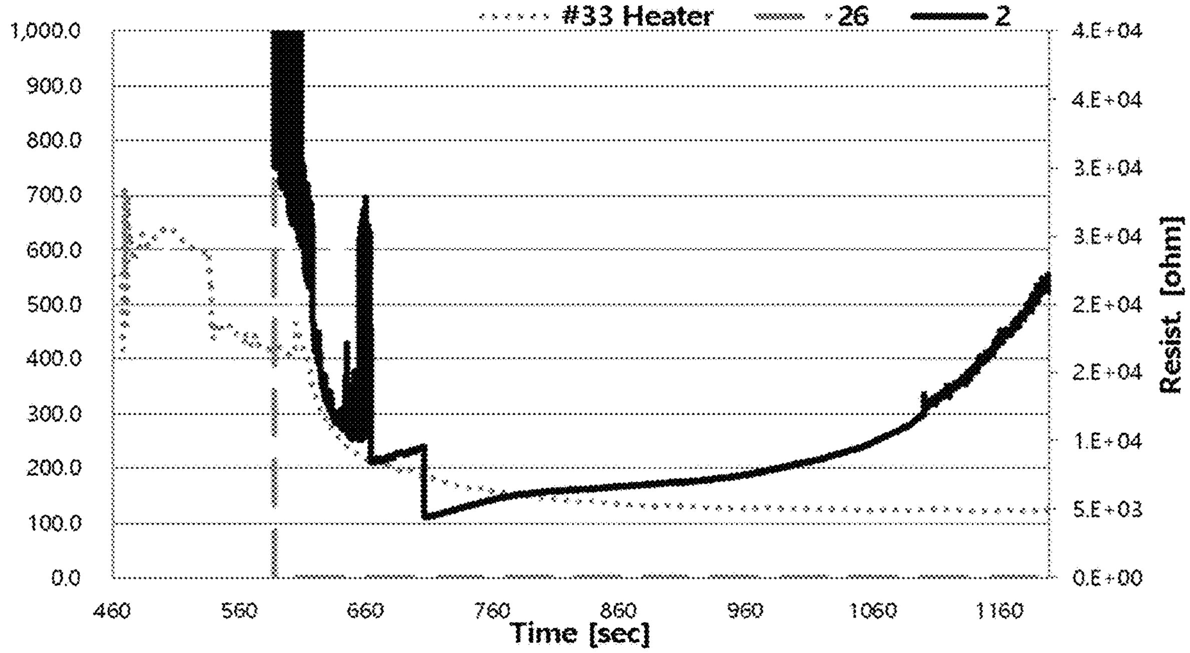

【FIG. 12】
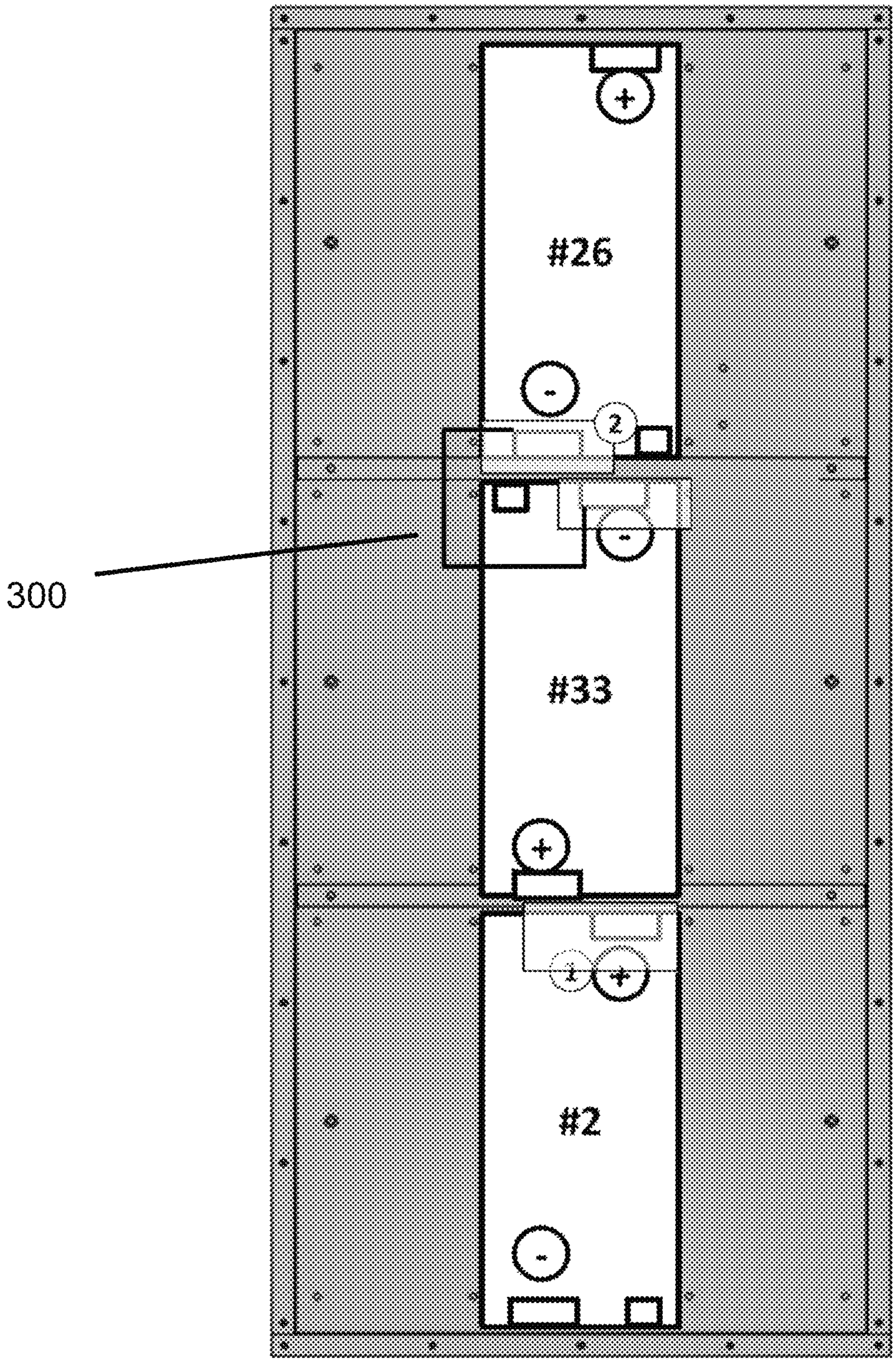

【FIG. 13】
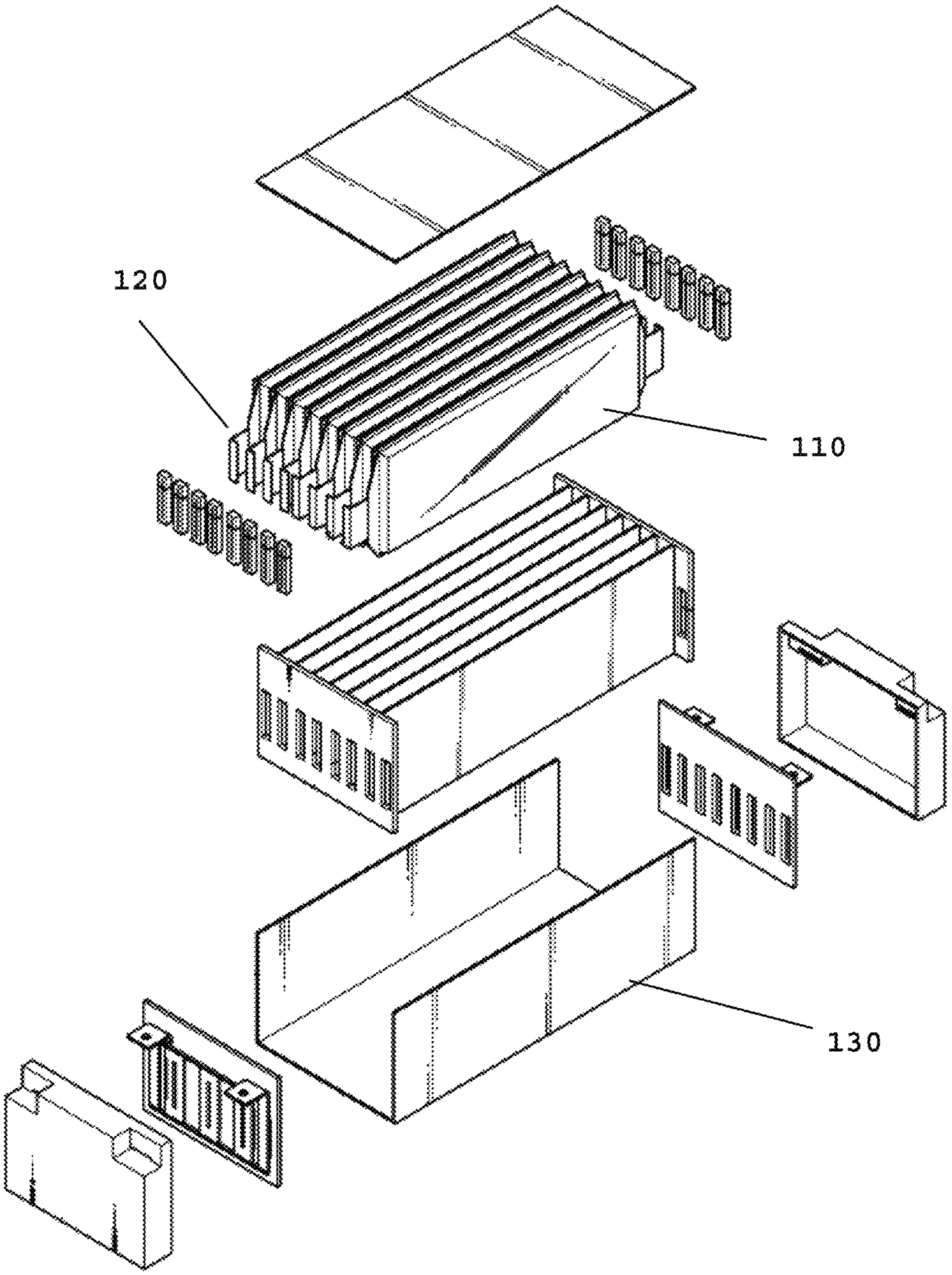

BATTERY PACK HAVING BLOCKING PLATE OVER A CONNECTION BUSBAR

TECHNICAL FIELD

This application claims the benefit of priority to Korean Patent Application No. 2020-0001345 filed on Jan. 6, 2020, the disclosure of which is hereby incorporated by reference herein its entirety.

The present invention relates to a battery pack with improved safety and a secondary battery including the same, and more particularly to a battery pack including two or more submodules, in each of which a plurality of unit cells, each of which includes an electrode assembly and an electrode lead protruding from the electrode assembly, is disposed, a pack case configured to receive the submodules, a connection busbar configured to connect the submodules to each other, a terminal unit constituted by a cluster of electrode leads electrically connected to each other, the terminal unit being connected to the connection busbar, and a blocking structure configured to wrap the terminal unit, and the upper end and the side surface of the connection busbar at the portion thereof connected to the terminal unit, and a secondary battery including the same.

BACKGROUND ART

With technological development of mobile devices, such as mobile phones, laptop computers, camcorders, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of high-capacity, high-efficiency secondary batteries.

With an increase in demand for secondary batteries and necessity for high-capacity batteries, various attempts to increase the capacities of the secondary batteries have been made. Although there is a case in which the capacity of one battery cell is increased and used, a plurality of battery cells is electrically connected to each other so as to be used as a single battery in a general way. In general, it is preferable that a plurality of battery cells be electrically connected to each other in series or in parallel to form a battery module and a plurality of battery modules be received in a battery case so as to be used in the form of a battery pack.

For a high-capacity battery or a battery pack, however, it is difficult to cool the battery, compared to a single battery cell, whereby there is a higher danger of thermal runaway, fire, or explosion. In order to improve overall safety of the battery pack, therefore, a separate alarm system may be provided or a cooling or fire extinguishing construction may be added.

A separate member may be added to the battery pack or the structure of the battery pack may be changed in order to secure safety of the battery pack. However, this configuration is provided to prevent fire breakout in or abnormal operation of an abnormal battery module, and a configuration capable of preventing spread of fire to a module adjacent to an abnormal battery module to thus prevent transfer of thermal runaway is not considered.

FIG. 1 is a perspective view of a conventional battery pack. The conventional battery pack includes two or more submodules 10, in each of which a plurality of unit cells is disposed, a terminal unit 20 constituted by a cluster of electrode leads of the submodule 10, and a connection busbar 30 configured to connect the submodules 10 to each other, wherein the terminal unit 20 and the connection busbar 30 are covered by a bolt cover 40 so as to be insulated. The terminal unit 20, the connection busbar 30 and bolt cover 40 are stacked vertically on the submodule 10.

The bolt cover 40, which is provided for insulation, covers the terminal unit 20 and only a portion of the connection busbar 30 connected thereto, or is provided in the form of a cap fitted to the terminal unit 20, as shown in FIG. 1.

However, the bolt cover 40 does not protect the terminal unit 20 and a busbar assembly 50 coupled to electrode leads of the submodule 10. Particularly, in the case in which fire breaks out in an adjacent module of the conventional battery pack of FIG. 1, heat may be transferred through a connection region between the terminal unit 20 and the connection busbar 30, which are exposed more than the other regions, whereby fire may easily occur in succession. In addition, a conductive pollutant discharged from a module damaged due to fire may permeate into the connection region between the terminal unit 20 and the connection busbar 30, whereby the submodule 10 may be damaged or open-circuited and thus fire may be caused.

Patent Document 1 provides a terminal cover configured to protect an electrode terminal unit. However, this is provided for connection with an external device. In addition, the terminal cover of Patent Document 1 is configured in the form of a cap capable of covering only a terminal, and the cap is provided with only an O-ring for each attachment and detachment. However, a structure capable of protecting the electrode terminal unit from fire or a pollutant is not provided.

Patent Document 2 provides a terminal cover configured to protect an electrode terminal unit, wherein the terminal cover is made of a soft material that can be elastically deformed. However, the terminal cover is not a structure capable of protecting the terminal unit from fire or a pollutant. In addition, the terminal cover is a construction configured to protect a terminal outside a battery pack but is not a construction configured to protect a connection portion between battery modules.

Therefore, there is a need for a construction capable of preventing transfer of thermal runaway between submodules in a battery pack and protecting a battery module from the outside.

PRIOR ART DOCUMENTS

Patent Documents (Patent Document 1) Korean Patent Application Publication No. 2018-0058552

(Patent Document 2) Korean Patent Application Publication No. 2019-0088675

DISCLOSURE

Technical Problem

The present invention has been made in view of the above problems, and it is an object of the present invention to protect submodules by wrapping an exposed region of each submodule using a blocking structure configured to protect a terminal unit of the submodule and a connection busbar configured to electrically connect the submodules to each other.

It is another object of the present invention to prevent an adjacent submodule from being affected when a specific submodule is abnormal by manufacturing the blocking structure using a material that exhibits heat resistance and chemical resistance.

It is a further object of the present invention to prevent the occurrence of fire or explosion in succession by protecting each submodule, thereby preventing pecuniary and non-pecuniary losses.

Technical Solution

In order to accomplish the above objects, a battery pack according to the present invention includes two or more submodules, each of the two or more submodules having a plurality of unit cells, each of the plurality of unit cells comprising an electrode assembly and an electrode lead protruding from the electrode assembly, a pack case configured to receive the two or more submodules, a connection busbar configured to connect the two or more submodules to each other, a terminal comprising a cluster of the electrode leads electrically connected to each other, and a blocking structure configured to wrap the terminal, and the upper end and the side surface of the connection busbar at the portion thereof connected to the terminal.

The blocking structure may be made of an insulation material that exhibits chemical resistance and thermal insulation.

The insulation material may include silicate.

The insulation material may include mica or ceramics.

The blocking structure may include an upper structure, a terminal protecting portion protruding from the upper structure so as to have a shape corresponding to the terminal and the connection busbar, a side structure, and a pollutant permeation preventing portion located at the lower part of the upper structure, the pollutant permeation preventing portion being configured to protect the terminal unit and opposite side surfaces of the connection busbar.

The pollutant permeation preventing portion may be coupled to a space near the terminal unit and the connection busbar connected thereto.

The blocking structure may further include a thermal insulation cover configured to protect the blocking structure.

The thermal insulation cover may include a side cover and an upper end cover provided at the upper part of the battery pack where the blocking structure is located.

The thermal insulation cover may be made of a thermal insulation material.

The thermal insulation material may include silicate.

The thermal insulation material may include mica or ceramics.

The thermal insulation cover may be configured to entirely cover the connection busbar.

The thermal insulation cover may further includes a rear cover provided parallel to the side cover, the rear cover being configured to protect the connection busbar and the rear surface of the blocking structure.

In addition, the present invention includes a device using the battery pack as an energy source.

The device may be any one selected from a group consisting of a mobile phone, a tablet computer, a laptop computer, a power tool, a wearable electronic device, an electric vehicle, a hybrid electric vehicle, a plug-in hybrid electric vehicle, and an energy storage system.

In the present invention, one or more constructions that do not conflict with each other may be selected and combined from among the above constructions.

DESCRIPTION OF DRAWINGS

FIG. 1 is a perspective view of a conventional battery pack.

FIG. 2 is a perspective view of a battery pack according to a first preferred embodiment of the present invention.

FIG. 3 is a perspective view of a blocking structure according to the first preferred embodiment of the present invention when viewed from the rear.

FIG. 4 is a front view of the blocking structure according to the first preferred embodiment of the present invention.

FIG. 5 is a side view of the blocking structure according to the first preferred embodiment of the present invention.

FIG. 6 is a perspective view of a battery pack according to a second preferred embodiment of the present invention.

FIG. 7 is a perspective view of a thermal insulation cover provided in a battery pack according to a third preferred embodiment of the present invention.

FIG. 8 is a perspective view of the battery pack according to the third preferred embodiment of the present invention before coupling.

FIG. 9 is a perspective view of the battery pack according to the third preferred embodiment of the present invention after coupling.

FIG. 10 is a view showing a modification of the third preferred embodiment of the present invention.

FIG. 11 is a resistance measurement graph of the battery pack according to the second preferred embodiment of the present invention and Comparative Example.

FIG. 12 is a schematic view showing the dispositions of submodules for resistance measurement in the battery pack according to the second preferred embodiment of the present invention and Comparative Example.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack including a blocking structure according to the present invention and a secondary battery including the same will be described with reference to the accompanying drawings.

FIG. 2 is a perspective view of a battery pack according to a first preferred embodiment of the present invention, FIG. 3 is a perspective view of a blocking structure according to the first preferred embodiment of the present invention when viewed from the rear, FIG. 4 is a front view of the blocking structure according to the first preferred embodiment of the present invention, and FIG. 5 is a side view of the blocking structure according to the first preferred embodiment of the present invention.

Referring to FIG. 2, the battery pack according to the first preferred embodiment of the present invention includes two or more submodules 100, in each of which a plurality of unit cells, each of which includes an electrode assembly and an electrode lead protruding from the electrode assembly, is disposed, a pack case 600 configured to receive the submodules, a connection busbar 300 configured to connect the submodules to each other, a terminal unit constituted by a cluster of electrode leads electrically connected to each other, the terminal unit being connected to the connection busbar, and a blocking structure 400 including a busbar frame cover, the blocking structure being configured to wrap the terminal unit, and the upper end and the side surface of the connection busbar at the portion thereof connected to the terminal unit.

In each of the submodules 100, a plurality of unit cells, each of which includes an electrode assembly and an electrode lead protruding from the electrode assembly, is disposed.

The electrode assembly may be a jelly-roll type electrode assembly, which is configured to have a structure in which a long sheet type positive electrode and a long sheet type negative electrode are wound in the state in which a separator is interposed between the positive electrode and the negative electrode, a stacked type electrode assembly including unit cells, each of which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which unit cells are stacked in the state in which a separator is interposed therebetween and are then attached to each other. However, the present invention is not limited thereto.

The electrode assembly is mounted in the pack case 600. An inner layer and an outer layer of the pack case 600 may be made of different materials, although the layers may generally be made of the same material. The inner layer, which directly contacts the electrode assembly, must exhibit high insulation properties and high resistance to an electrolytic solution. In addition, the inner layer must exhibit high sealability in order to hermetically seal the pack case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene-acrylic acid, or polybutylene, a polyurethane resin, and a polyimide resin, which exhibit excellent chemical resistance and high sealability. However, the present invention is not limited thereto. Specifically, polypropylene, which exhibits excellent mechanical-physical properties, such as tensile strength, rigidity, surface hardness, and resistance to impact strength, and excellent chemical resistance, may be used.

The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

Meanwhile, electrode leads constituted by a positive electrode lead and a negative electrode lead may be exposed out of the pack case after being electrically connected to a positive electrode tab and a negative electrode tab of the electrode assembly, respectively, or the electrode leads may directly connect the electrode assembly to the outside of the pack case without a positive electrode tab and a negative electrode tab. However, the present invention is not limited thereto. At this time, the portion of the cluster of electrode leads exposed out of the pack case is referred to as a terminal unit (not shown in FIG. 2; see FIG. 1). The terminal unit (not shown in FIG. 2; see FIG. 1) is connected to the connection busbar 300, which is configured to electrically connect the submodules to each other. The battery cell described above corresponds to a generally known construction, and therefore a more detailed description thereof will be omitted.

The submodule 100 means a component formed as the result of a plurality of unit cells, each of which includes an electrode assembly and an electrode lead extending from the electrode assembly, being stacked side by side in a horizontal or vertical direction in order to satisfy the capacity or output of the battery pack.

A plurality of submodules 100 is received in the pack case 600 in the state of being aligned side by side.

A connection busbar 300 bent so as to have a predetermined shape is provided between adjacent submodules 100 in order to connect the submodules 100 in series.

As can be seen from FIG. 2, the battery pack according to the present invention includes a blocking structure 400 configured to wrap the terminal unit, and the upper end and the side surface of the connection busbar 300.

As shown in FIGS. 2 to 5, the blocking structure 400 is a blocking plate and may include an upper structure 410 on a top surface of the submodule 100, a terminal protecting portion 420 protruding upwardly from the upper structure so as to have a shape corresponding to the terminal unit and the connection busbar, a side structure 430 extending downwardly from a front edge of the upper structure and below the top surface of the submodule 100, and a pollutant permeation preventing portion 440 located at the lower part of the upper structure 410, the pollutant permeation preventing portion being configured to protect the terminal unit and opposite side surfaces of the connection busbar 300. As seen in FIG. 2, the side structure 430 extends along a side of the battery module 100. Together, the upper structure 410 and side structure 430 form an L-shape, as seen in the side edge of the blocking structure 400. The pollutant permeation preventing portion 440 extends downwardly from a lower surface of the upper structure 410 and on opposite sides of the connection busbar 300. The terminal unit, the connection busbar 300 and blocking plate are stacked vertically on the submodule.

The upper part of the upper structure 410 is configured to have a plate shape so as to be easily coupled to another component of the battery pack, such as an insulation cover or a cooling plate.

The blocking structure 400 may include a terminal protecting portion 420 protruding so as to have a shape corresponding to the terminal unit and the connection busbar 300. The terminal protecting portion 420 has a shape that wraps the terminal unit and the upper end portion and the side surface of the connection busbar 300 connected to the terminal unit. The terminal protecting portion 420 protrudes so as to have a shape corresponding to the terminal unit and the connection busbar 300, whereby the protruding portion of the terminal protecting portion is minimized. As a result, the size of the battery module is decreased, whereby the overall capacity of the battery pack is increased.

The terminal protecting portion 420 is formed so as to wrap the portion connected to the terminal unit and the portion of the connection busbar 300 provided at the connection busbar receiving portion 12 of the cartridge 11 shown in FIG. 1.

Preferably, the different submodule facing portion of the side structure 430 has a plate shape so as to allow a different member to be coupled thereto or not to hinder a different member. This shape may be changed depending on the shape of the battery pack or the battery module.

The pollutant permeation preventing portion 440 protects the terminal unit and opposite side surfaces of the connection busbar 300. The pollutant permeation preventing portion 440 protects empty spaces formed in the terminal unit 20 provided at opposite side surfaces of the coupling point between terminal unit and the connection busbar 30 shown in FIG. 1.

The pollutant permeation preventing portion 440 may be coupled near the terminal unit and the connection busbar connected thereto. To this end, the pollutant permeation preventing portion 440 according to the present invention may extend downwards from the upper structure 410, as shown in FIG. 3. In addition, the pollutant permeation preventing portion 440 may be provided with a protrusion protruding in a direction toward a non-facing portion of the terminal unit in order to fix the blocking structure 400 while preventing permeation of a pollutant.

As shown in FIG. 4, the upper part of the protrusion of the pollutant permeation preventing portion 440 may have a right triangular shape disposed in parallel to the upper structure. When a pollutant permeates inside, the pollutant moves to an unexposed region, since the upper part of the protrusion is disposed in parallel to the upper structure.

As shown in FIG. 5, the protrusion may have a length equivalent to 0.1 to 0.7 times the length of the pollutant permeation preventing portion 440. In the case in which the length of the protrusion is too small, the protrusion may not fix the pollutant permeation preventing portion 440 and may be damaged even by small movement thereof. In the case in which the length of the protrusion is too large, the size of the pollutant permeation preventing portion 440 may be excessively increased, whereby the battery shape or battery size for the battery output or capacity may be limited.

As shown in FIG. 5, the pollutant permeation preventing portion 440 may be configured to have a shape that is not connected to the side structure 430.

As shown in FIGS. 3 to 5, the blocking structure 400 according to the present invention may further include a fixing portion 450 provided at each side surface of the lower part of the upper structure 410. The fixing portion 450 serves to fix the blocking structure 400 to support the blocking structure 400.

As shown in FIG. 5, a different module facing portion of the fixing portion 450 may be longer, and the fixing portion may be shorter with decreasing distance from the connection busbar 300 of a module that is connected thereto. This structure is a structure in which the blocking structure 400 is disposed so as to prevent movement of flames generated in a different module.

As can be seen from FIG. 4, the fixing portion 450 is shorter than the pollutant permeation preventing portion 440. Also, in the case in which the fixing portion 450 is excessively long, the volume of the blocking structure 400 occupied in the battery pack is excessively increased, which is ineffective, whereby a flame prevention effect may be reduced.

As shown in FIGS. 3 and 4, the blocking structure 400 according to the present invention may further include a connection busbar receiving portion 460 configured to receive the connection busbar 300. The upper structure 410 wraps the connection busbar receiving portion 460, i.e. a space configured to receive the connection busbar. The connection busbar receiving portion 460 is formed so as to have a size equal to the size of the connection busbar 300. When the connection busbar 300 is coupled, therefore, it is possible to prevent permeation of foreign matter.

The blocking structure 400 may be made of an insulation material that exhibits chemical resistance and thermal insulation in order to prevent the submodule 100 from being damaged by fire in an adjacent submodule or a pollutant. Any material that can be used in a battery may be used as the insulation material that exhibits chemical resistance and thermal insulation. In consideration of use of the battery pack, however, a material that is light and generates no toxic substance is preferably used.

As an example of the material, a compound including silicon may be used. Examples of the compound including silicon may include mica and ceramics. In addition, nylon or polyethylene terephthalate, which is a heat-resistant polymer, may be coated so as not to react with a chemical material in order to be used as the material for the blocking structure 400.

Although the blocking structure 400 may be made of a single material, different materials may be used depending on the respective facing portions thereof. As an example, the submodule facing portion of the blocking structure may be made of a material that exhibits higher chemical resistance, and the different submodule facing portion of the blocking structure and the upper part of the submodule may be made of a material that exhibits higher heat resistance.

In addition, although the blocking structure 400 may be configured to have a single plate, the blocking structure may be configured to have two or more layers. Preferably, however, the blocking structure 400 is configured to have a single plate in order to prevent the thickness of the blocking structure 400 from being excessively increased. In the case in which the blocking structure 400 has two or more plates, the blocking structure may be configured to have a structure in which a honeycomb-shaped core is formed between the plates, like a fire wall. In addition, a thermal insulation material may be provided between the plates. For example, a mineral board, C.F.B, a ceramic fiber hard board, or Super H.T.B may be used as the thermal insulation material.

It is preferable that the blocking structure have a thickness capable of protecting the submodule 100 from flames and a pollutant. Although the thickness of the blocking structure may be changed depending on the thickness or capacity of the submodule or the battery pack, it is preferable that the thickness of the blocking structure be between 0.2 mm and 50 mm. In the case in which the thickness of the blocking structure is less than 0.2 mm, the blocking structure may not protect the submodule 100 from a pollutant and flames. In the case in which the thickness of the blocking structure is greater than 50 mm, the size of the submodule 100 may be increased, whereby the density and capacity of the battery pack may be reduced.

FIG. 6 is a perspective view of a battery pack according to a second preferred embodiment of the present invention.

The battery pack according to the second preferred embodiment of the present invention may further include a side protecting portion 700 provided at each of opposite side portions of the upper structure 410 of the blocking structure 400 of the battery pack according to the first embodiment.

The side protecting portion 700 may be configured to protect not only the upper structure 410 but also the side surface of the pollutant permeation preventing portion 440, as shown in FIG. 6. In addition, although the side protecting portion 700 is provided at the upper end of the upper structure 410, as shown in FIG. 6, the side protecting portion 700 may be provided at the lower part of the upper structure. In addition, although the side protecting portion may be provided as a separate member, as shown in FIG. 6, the side protecting portion may be integrally formed with the blocking structure 400.

The battery pack according to the present invention may further include a thermal insulation cover 800.

FIG. 7 is a perspective view of a thermal insulation cover 800 provided in a battery pack according to a third preferred embodiment of the present invention. The thermal insulation cover 800 is configured to protect the blocking structure 400. Of course, a structure configured to protect a general terminal cover without the blocking structure 400 is also possible.

The thermal insulation cover 800 may include an upper end cover 810 provided at the upper part of the battery pack where the blocking structure 400 is located to cover a top surface of the submodule and a side cover 820 extending downwardly from a front edge of the upper end cover 810 to cover a front surface of the submodule. The thermal insulation cover 800 may further include a fastening device 830 configured to couple the thermal insulation cover 800 to the submodule 100. The fastening device 830 may be fitted onto the thermal insulation cover 800 in the form of a clip so as to be fixed thereto or may be formed as a portion of the thermal insulation cover 800.

The upper part of the upper end cover 810 is configured to have a flat plate shape, and the lower part of the upper end cover is configured to have a shape corresponding to a coupling region. In general, the upper end cover is preferably formed so as to have a plate shape. It is preferable that the size of the upper end cover 810 be a size capable of covering the blocking structure. That is, the size of the upper end cover may be a size capable of reaching the surface of the connection busbar 300. In addition, as shown in FIG. 10, the thermal insulation cover 800 according to the present invention may cover the entirety of the connection busbar 300 provided at the upper end of the submodule 100, or may cover only a portion of the connection busbar 300. This configuration is capable of preventing the occurrence of fire or heat due to fire back to an ignition point thereof.

The upper part of the side cover 820 is configured to have a flat plate shape, in the same manner as the upper part of the upper end cover 810, and the lower part of the side cover is configured to have a shape corresponding to a coupling region. The size of the side cover 820 may be equal to or greater than the size of the side structure 430 of the blocking structure 400. The blocking structure 400 may have a size capable of protecting the electrode terminals of the submodule 100.

The fastening device 830 may be provided at each of opposite side surfaces of the thermal insulation cover 800 in order to fix the thermal insulation cover 800 to the submodule 100. The position of the fastening device 830 is not restricted as long as the thermal insulation cover 800 is not separated by impact, fire, or explosion.

Although the shape of the fastening device 830 is not restricted as long as it is possible to increase fastening force, the fastening device may be provided at the connection portion between the upper end cover 810 and the side cover 820 of the thermal insulation cover 800 in order to fix both the upper end cover 810 and the side cover 820 to the submodule 100 or to fix the side cover 820. In addition, the upper end cover may be provided with only a predetermined catching portion, and the side cover may be provided with a fixing portion configured not to be detachable when fixed. This is based on gravity applied to the upper end cover 810, and may be changed depending on the position of the submodule and the position of the thermal insulation cover 800.

FIG. 8 is a perspective view of the battery pack according to the third preferred embodiment of the present invention before coupling, and FIG. 9 is a perspective view of the battery pack according to the third preferred embodiment of the present invention after coupling. The blocking plate 400 covers the end of the connection busbar 300. The thermal insulation cover 800 covers the blocking plate 400 so that the blocking plate 400 is between the thermal insulation cover 800 and the connection busbar 300.

As an example of the fastening device, as shown in FIG. 9, a side fastening device 831 configured to fix the side cover 820 and an upper end fastening device 832 configured to fix the upper end cover 810 are fixed by a single fastening device fixing portion 833, and the side fastening device 831 and the upper end fastening device 832 are provided at the upper end so as to be fixed to the battery pack.

Although the fastening device 830 may be located at one side surface of the thermal insulation cover 800 adjacent to the side corner thereof, it is preferable that the fastening device be provided at each of opposite side surfaces of the thermal insulation cover 800 in order to increase fixing force.

The thermal insulation cover 800 may be coupled to a thermal insulation cover coupling portion The thermal insulation cover coupling portion may be configured to have a shape corresponding to the fastening device 830.

Although the thermal insulation cover 800 may have the above shape, the shape of the thermal insulation cover is not restricted as long as it is possible to protect the blocking structure 400.

It is preferable that the thermal insulation cover 800 be made of a thermal insulation material.

The reason for this is that it is necessary to block the transfer of heat due to fire breakout. In addition, the thermal insulation material may exhibit chemical resistance.

Since the thermal insulation cover 800 is made of a material that exhibits chemical resistance and thermal insulation, the thermal insulation cover 800 may primarily protect the submodule 100, and the blocking structure 400 may secondarily protect the submodule, whereby it is possible to further protect the submodule 100.

Any material that can be used in a battery may be used as the thermal insulation material. In consideration of use of the battery pack, however, a material that has predetermined strength and generates no toxic substance is preferably used.

As an example of the material, a compound including silicon may be used. Examples of the compound including silicon may include mica and ceramics. In addition, nylon or polyethylene terephthalate, which is a heat-resistant polymer, may be coated so as not to react with a chemical material in order to be used as the material for the thermal insulation cover 800.

In the third preferred embodiment of the present invention, the thermal insulation cover 800 of FIG. 8 has a shape coupled so as to wrap the upper end and the side portion of the submodule 100.

The fastening device 830 of the thermal insulation cover 800 may have a separate thermal insulation cover coupling portion.

FIG. 10 is a view showing a modification of the third preferred embodiment of the present invention.

The modification of the third preferred embodiment of the present invention may have a shape in which the thermal insulation cover 800 covers the entirety of the connection busbar 300 provided at the upper part of the submodule 100 or may have a shape in which the thermal insulation cover covers only a portion of the connection busbar 300. As described above, fire tends to spread while returning to an ignition point thereof when fire breaks out. For this reason, the thermal insulation cover may cover the entirety of the connection busbar 300 in order to protect the connection busbar 300 and to prevent spread of fire.

Also, in order to prevent spread of fire due to fire back, the thermal insulation cover 800 according to the present invention may further include a rear cover 840 provided parallel to the side cover 820, the rear cover being configured to protect the connection busbar 300 and the rear surface of the blocking structure 400. The rear cover 840 may be configured to have a shape that protects a portion that is not protected by the connection busbar 300, as shown in FIG. 10, or may have a long plate shape configured to protect the connection busbar 300. In addition, the rear cover 840 according to the present invention may have a structure configured to also protect a side surface portion of the blocking structure adjacent to the rear surface thereof, as shown in FIG. 10. This structure is a structure prepared for the case in which some of fire is separated from the main current of fire and returns back.

Resistance values between a terminal portion and a mono frame in Example (2) to which the blocking structure according to the second embodiment of the present invention and the thermal insulation cover are applied and Comparative Example (26) in which only the thermal insulation cover is provided without the blocking structure according to the present invention are shown in the graph of FIG. 11. Model JH4 submodules sold by LG Chem were used as submodules, and mica was used as the material for the blocking structure according to the present invention and the thermal insulation cover.

A submodule of Example (2) and a submodule of Comparative Example (26) were disposed at opposite side surfaces of a trigger submodule (#33), and fire was set to the trigger submodule (#33). FIG. 12 is a schematic view showing the dispositions of submodules for resistance measurement in the battery pack according to the second preferred embodiment of the present invention and Comparative Example. At this time, resistance values between the terminal unit and the submodule indicated by part 1 and part 2 in FIG. 12 were measured as the resistance values. As shown in FIG. 11, it can be seen that Example (2) of the submodule according to the present invention was not affected by fire, and therefore a resistance value of 5.E+03 Ω or more was maintained, whereas the submodule according to Comparative Example was affected a predetermined time (560 seconds) after fire broke out in an adjacent module, whereby the resistance of the submodule converged upon 0. In the case in which the blocking structure according to the present invention is provided, therefore, it can be seen that a predetermined resistance value, i.e. 3000 $2 or more, is maintained, whereby electrical conduction due to fire breakout does not occur and thus fire transfer due to overcurrent does not occur.

In the present invention, a connector or a fuse may be provided between the modules in order to prevent fire transfer due to overcurrent.

The present invention may provide a device using any one of the battery packs described above as an energy source.

The device may be any one selected from the group consisting of a mobile phone, a tablet computer, a laptop computer, a power tool, a wearable electronic device, an electric vehicle, a hybrid electric vehicle, a plug-in hybrid electric vehicle, and an energy storage system.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

- 10, 100: Submodules
- 11: Cartridge
- 12: Connection busbar receiving portion
- 20: Terminal unit
- 30, 300: Connection busbars
- 40: Bolt cover
- 400: Blocking structure
- 410: Upper structure
- 420: Terminal protecting portion
- 430: Side structure
- 440: Pollutant permeation preventing portion
- 450: Fixing portion
- 460: Connection busbar receiving portion
- 50: Busbar assemblies
- 600: Pack case
- 700: Side protecting portion
- 800: Thermal insulation cover
- 810: Upper end cover
- 820: Side cover
- 830: Fastening device
- 831: Side fastening device
- 832: Upper end fastening device
- 833: Fastening device fixing portion
- 840: Rear cover

INDUSTRIAL APPLICABILITY

A battery pack according to the present invention includes a blocking structure configured to wrap a terminal unit, and a connection busbar of a submodule, whereby it is possible to protect an exposed region of the submodule while preventing movement of current from a connection region between the terminal unit and the connection busbar to a different region, and therefore it is possible to prevent continuous damage to submodules due to an adjacent submodule.

The blocking structure is made of a material that exhibits chemical resistance and thermal insulation, whereby it is possible to prevent the terminal unit and the connection busbar from being polluted by a pollutant generated as the result of damage to an adjacent submodule. In addition, when fire breaks out in an adjacent submodule, it is possible to immediately prevent spread of fire using a thermal insulation material and to prevent heat to a predetermined extent, whereby it is possible to protect the submodule. As a result, it is possible to secure a time necessary to operate a fire extinguishing system in the battery pack or to warn a user, whereby it is possible to prevent further damage to the battery pack.

In addition, it is possible to improve overall safety of a battery through a simple construction, such as the provision of a pollutant permeation preventing portion at the side surface portion of the blocking structure or the provision of a thermal insulation cover in addition to the blocking structure.

The invention claimed is:

1. A battery pack comprising:
- a plurality of submodules;
- a pack case configured to receive the plurality of submodules; and
- a connection busbar configured to connect a first submodule and a second submodule of the plurality of submodules to each other,
- wherein the first submodule of the plurality of submodules comprises:
- a terminal unit directly on a top surface of the first submodule connected to the connection busbar, the top surface of the first submodule being spaced from a bottom surface of the first submodule in a vertical direction;
- a blocking plate configured to cover the terminal unit in the vertical direction, an upper end of the connection busbar, and a side surface of the connection busbar; and
- a thermal insulation cover covering the blocking plate so that the blocking plate is between the thermal insulation cover and the connection busbar,
- wherein the terminal unit, the connection busbar, and the blocking plate are stacked in the vertical direction, and
- wherein the blocking plate comprises an upper structure and a side structure extending downwardly from a front edge of the upper structure and below the top surface of the first submodule.

2. The battery pack according to claim 1, wherein the blocking plate comprises an insulation material that exhibits chemical resistance and thermal insulation.

3. The battery pack according to claim 2, wherein the insulation material comprises silicate.

4. The battery pack according to claim 2, wherein the insulation material comprises mica or ceramics.

5. A battery pack comprising:
- a plurality of submodules;
- a pack case configured to receive the plurality of submodules; and
- a connection busbar configured to connect a first submodule and a second submodule of the plurality of submodules to each other,
- wherein the first submodule of the plurality of submodules comprises:
- a terminal unit on a top surface of the first submodule connected to the connection busbar, the terminal unit and connection busbar being stacked vertically;
- a blocking plate configured to cover the terminal unit, an upper end of the connection busbar, and a side surface of the connection busbar; and
- a thermal insulation cover covering the blocking plate so that the blocking plate is between the thermal insulation cover and the connection busbar
- wherein the blocking plate comprises:
- an upper structure;
- a terminal protecting portion protruding upwardly from the upper structure;
- a side structure extending downwardly from a front edge of the upper structure; and
- a pollutant permeation preventing portion located at a lower part of the upper structure, the pollutant permeation preventing section being configured to protect the terminal unit and opposite side surfaces of the connection busbar.

6. The battery pack according to claim 5, wherein the pollutant permeation preventing portion extends downwardly from a lower surface of the upper structure and on opposite sides of the connection busbar.

7. The battery pack according to claim 1, wherein the thermal insulation cover comprises:
- an upper end cover provided at an upper part of the battery pack at which the terminal unit and the blocking plate are located; and
- a side cover extending downwardly from a front edge of the upper end cover.

8. The battery pack according to claim 1, wherein the thermal insulation cover comprises a thermal insulation material.

9. The battery pack according to claim 8, wherein the thermal insulation material comprises silicate.

10. The battery pack according to claim 8, wherein the thermal insulation material comprises mica or ceramics.

11. The battery pack according to claim 7, wherein the thermal insulation cover is configured to entirely cover the connection busbar.

12. The battery pack according to claim 7, wherein the thermal insulation cover further comprises a rear cover provided parallel to the side cover, the rear cover being configured to protect the connection busbar and a rear surface of the blocking plate.

13. A device using the battery pack according to claim 1 as an energy source.

14. The device according to claim 13, wherein the device is any one selected from a group consisting of a mobile phone, a tablet computer, a laptop computer, a power tool, a wearable electronic device, an electric vehicle, a hybrid electric vehicle, a plug-in hybrid electric vehicle, and an energy storage system.

15. The battery pack according to claim 1, wherein the thermal insulation cover has an upper end cover covering the top surface and a side cover covering a front surface of the first submodule.

* * * * *